United States Patent
Park et al.

(10) Patent No.: US 12,147,703 B2
(45) Date of Patent: Nov. 19, 2024

(54) VEHICLE

(71) Applicants: Hyundai Motor Company, Seoul (KR); Kia Corporation, Seoul (KR)

(72) Inventors: Jiyong Park, Cheonan-si (KR); Gyeongbin Kong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/806,533

(22) Filed: Jun. 13, 2022

(65) Prior Publication Data

US 2023/0153029 A1 May 18, 2023

(30) Foreign Application Priority Data

Nov. 16, 2021 (KR) .................. 10-2021-0158024

(51) Int. Cl.
*G06F 3/06* (2006.01)
(52) U.S. Cl.
CPC .......... *G06F 3/0659* (2013.01); *G06F 3/0604* (2013.01); *G06F 3/0619* (2013.01); *G06F 3/0673* (2013.01)
(58) Field of Classification Search
CPC .... G06F 3/0659; G06F 3/0604; G06F 3/0619; G06F 3/0673; G06F 3/0616; G06F 3/0679; G06F 3/0653; G06F 12/0246
See application file for complete search history.

(56) References Cited

U.S. PATENT DOCUMENTS

| | | | |
|---|---|---|---|
| 2011/0082985 A1* | 4/2011 | Haines | G06F 3/0688 |
| | | | 711/E12.001 |
| 2013/0179624 A1* | 7/2013 | Lambert | G06F 12/0246 |
| | | | 711/E12.008 |
| 2020/0167307 A1* | 5/2020 | Okada | G06F 9/06 |

* cited by examiner

*Primary Examiner* — Jason W Blust
(74) *Attorney, Agent, or Firm* — Slater Matsil, LLP

(57) ABSTRACT

An architecture for memory management includes an application software component (ASW) configured to perform an algorithm for at least one function and transmit and receive data in the algorithm, a basic software (BSW) comprising a non-volatile memory manager (NVM), a state manager software component for managing the NVM, and a runtime environment configured to allow communication to be performed between the ASW and the state manager software component and between the BSW and the state manager software component, wherein, in a state of writing data to or reading data from a non-volatile memory managed by the NM, the state manager software component ends a read or write operation based on a number of reads being greater than or equal to a preset number of read times or a number of writes being greater than or equal to a preset number of write times.

16 Claims, 8 Drawing Sheets

VEHICLE

CROSS-REFERENCE TO RELATED APPLICATIONS

This application claims the benefit of Korean Patent Application No. 10-2021-0158024, filed on Nov. 16, 2021, which application is hereby incorporated herein by reference.

TECHNICAL FIELD

The disclosure relates to an architecture for memory management.

BACKGROUND

Automotive open system architecture (AUTOSAR) is a standardization platform to respond to the rapid increase in the use of embedded software for automotive electronic components, in which several automakers, vehicle component manufacturers, development tool suppliers, and semiconductor manufacturers participate.

An application software conforming to AUTOSAR standards is modularized into software components (also referred to as SWC).

A software component having common functions is based on the concept of reusing an application software using an open source, but this is limited to platform software.

An existing AUTOSAR platform provides standardized modules of a service layer, an electronic control unit (ECU) abstraction layer and a microcontroller abstraction layer corresponding to a basic software (BSW). In an application layer, the configurations of application software component are various depending on a developer or software architecture.

Currently, an AUTOSAR platform requires an algorithm of a software component to reliably and efficiently manage a non-volatile memory between the non-volatile memory and the software component.

More specifically, a non-volatile memory stores data such as mileage data and failure diagnosis data that should not be erased even after a vehicle is turned off (Key Off).

Due to hardware (HW) characteristics of non-volatile memory, the number of read/write operations is limited. Accordingly, when a lot of read/write operations are unnecessarily performed, the lifetime of the non-volatile memory may be shortened and the non-volatile memory may fail during the lifecycle of the vehicle. In this instance, reliability of data of read/write operations of the non-volatile memory is deteriorated, causing a fatal defect in the vehicle.

In the read/write processing of non-volatile memory, as information is transferred through function calls among various modules of AUTOSAR software, complementary technologies to ensure integrity are required in each process.

SUMMARY

The disclosure relates to an architecture for memory management. Particular embodiments relate to an automotive open system architecture (AUTOSAR)-based architecture for memory management. Various embodiments relate to an architecture for managing a non volatile memory (NVM) between the NVM and a software component (SWC) including a vehicle control logic.

An embodiment of the disclosure provides an architecture for memory management that may minimize read/write commands considering a lifetime of non-volatile memory, include complementary logic for reliable data exchange, and serve as a medium for data transmission and reception.

According to an embodiment of the disclosure, there is provided an architecture for memory management including an application software component (ASW) configured to perform an algorithm for at least one function and transmit and receive data in the algorithm, a basic software (BSW) including a non-volatile memory manager (NVM) for managing a non volatile memory, a state manager software component configured to manage the NVM, and a runtime environment (RTE) configured to allow communication to be performed between the ASW and the state manager software component and between the BSW and the state manager software component, wherein, when writing data to or reading data from the non-volatile memory, the state manager software component is configured to end a read operation or a write operation, based on a number of reads being greater than or equal to a preset number of times or a number of writes being greater than or equal to a preset number of times.

The ASW and the state manager software component are provided in an application layer of an automotive open system architecture (AUTOSAR)-based platform.

The state manager software component is configured to control an operation of reading data stored in the non-volatile memory, when a vehicle is turned on, and control an operation of writing data to the non-volatile memory, when the vehicle is turned off.

When a write on command is received, the state manager software component is configured to call a predetermined read function (Rte_Read) so that data to be written to the non-volatile memory is read from the ASW, and to write the read data to the non-volatile memory.

When the data is read through the RTE, the state manager software component is configured to determine whether an RTE error occurs, and when it is determined that the RTE error occurs, to end the write operation.

When controlling the write operation, the state manager software component is configured to request an error status get service for an individual block from the NVM of the BSW.

When requesting the error status get service, the state manager software component is configured to determine whether an RTE error occurs, and when it is determined that the RTE error occurs, to end the write operation.

When controlling the write operation, the state manager software component is configured to determine whether a result of the error status get service is in a pending state, and when it is determined that the result is not in the pending state, to request a write block service from the NVM by using the read data as a factor.

When requesting the write block service, the state manager software component is configured to determine whether an RTE error occurs, and when it is determined that the RTE error occurs, to end the write operation, and when it is determined that the result is in the pending state, to end the write operation.

The state manager software component is configured to set a flag to 'on' for a block in which writing of the read data is completed, and when data writing for all blocks of the NVM is completed, to initialize flags.

When a read on command is received, the state manager software component is configured to request an error status get service from the NVM to check a status of an individual block of the NVM.

When requesting the error status get service, the state manager software component is configured to determine whether an RTE error occurs, and when it is determined that the RTE error occurs, to end the read operation.

When controlling the read operation, the state manager software component is configured to determine whether a result of the error status get service is in a pending state, when it is determined that the result is not in the pending state, to request a read block service from the NVM, and when it is determined that the result is in the pending state, to end the read operation.

When requesting a read block service, the state manager software component is configured to determine whether the RTE error occurs, and when it is determined that the RTE error occurs, to end the read operation.

The state manager software component is configured to set a flag to 'on' for a block in which data reading is completed, and when data reading for all blocks of the NVM is completed, to initialize flags.

When the read on command is received, the ASW is configured to call a predetermined read function (Rte_Read) and to transmit read data to the ASW.

The ASW is configured to receive the data through a predetermined write function (Rte_Write) and to write the received data.

BRIEF DESCRIPTION OF THE DRAWINGS

These and/or other features of embodiments of the disclosure will become apparent and more readily appreciated from the following description of the embodiments, taken in conjunction with the accompanying drawings, in which.

DETAILED DESCRIPTION OF ILLUSTRATIVE EMBODIMENTS

Figure 1:
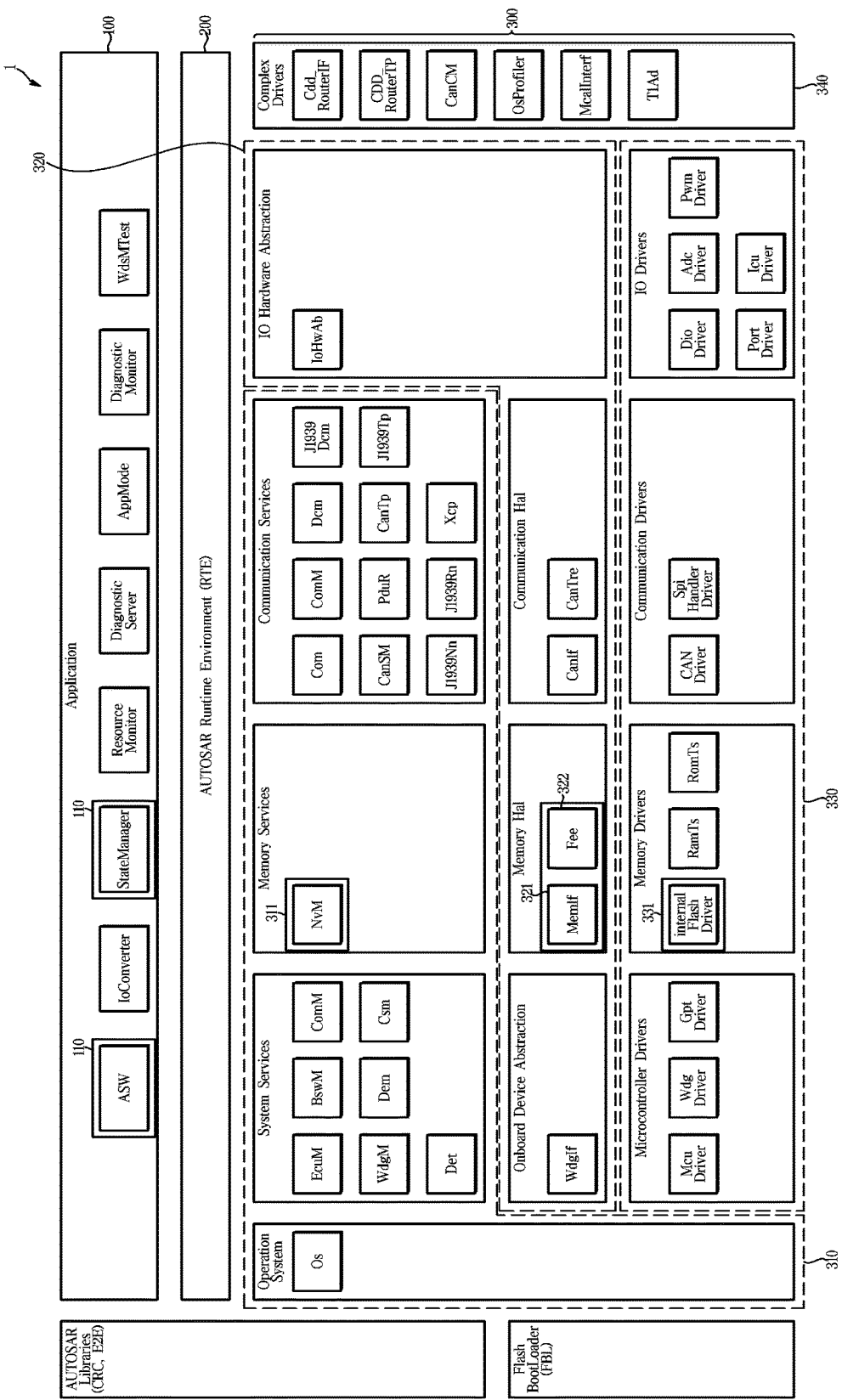
FIG. 1 is a diagram illustrating an example of an architecture of an automotive open system architecture (AUTOSAR) platform having an architecture for memory management according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~parts", "~members", "~modules", "~blocks" may be embodied as a single element, or a single of a "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a diagram illustrating an example of an architecture of an automotive open system architecture (AUTOSAR) platform having an architecture for memory management according to an embodiment.

AUTOSAR is a standardized and open platform. Here, 'standardized' means that a function name, a function, a return value, etc., are predefined. 'Open' means that it is available to anyone.

As shown in FIG. 1, AUTOSAR's platform architecture is a layered architecture, and maintenance of the system is easy because layers are separated.

The AUTOSAR's platform, i.e., the layered architecture enables hardware-independent software development and improves reusability and scalability.

The AUTOSAR's platform includes an application layer 100, a runtime environment (RTE) layer 200 and a basic software layer 300.

The application layer 100 is a platform where a basic software (BSW) required to drive an electronic control unit (ECU) for vehicles and an application software (ASW) capable of operating independently of a hardware are integrated.

The application layer 100 may include a plurality of software components (SWCs) each of which includes a vehicle control logic.

The SWC is an independent execution unit, and may be classified into a motor control software component, a battery control software component, a mode control software component and a user interface software component depending on an object to be controlled.

The SWC may also be divided into an actuator software component, a sensor software component, an application software component (ASW) no, an Io converter software component, a resource monitor software component, a diagnostic software component, a test software component, and a state manager software component 120 depending on a function.

The ASW 110 performs an algorithm for at least one function performed in a vehicle and is responsible for an actual function of the vehicle.

The ASW 110 is divided into a client/server protocol, or is divided into a sender/receiver protocol.

The client/server protocol is a remote procedure call method and is a widely used communication method in a distributed system.

In the client/server protocol, a provider of remote service is a server and a user of the remote service is a client. When the client requests to provide a specific service to the server after initializing communication, the server delivers required parameters to the client.

For example, the client/server may be used in an actuator in view of requesting and performing a function.

The sender/receiver protocol is a message transmission method, and an asynchronous communication protocol in which a sender sends information to a single one of a plurality of receivers.

For example, the sender/receiver may be used in a sensor in view of transmitting and receiving data.

The ASW no is referred to as 'runnable', and 'runnable' defined as above is scheduled by an operating system (OS).

Because each SWC is incapable of being directly connected to hardware or an OS, a thread or process may not be implemented. Instead, individual functions of SWC that are executed during runtime may be executed by the runnable.

According to a specification of a virtual functional bus (VFB), the runnable is defined as the order of instructions that may be started by the RTE 200.

The SWC may have a plurality of runnables.

A mapping between the OS and the runnable in the SWC is created by setting at least one ECU. The mapping is called by the RTE, and may be utilized in scheduling.

The state manager software component 120 is a software component that manages a non-volatile memory manager (NVM) 311 and a fault diagnosis event, and functions as an interface for startup/shutdown sequence management.

The ASW no and the state manager software component 120 in the application layer 100 may be used to manage a non-volatile memory.

The RTE 200 independently maps at least one SWC in the application layer 100 to at least one hardware and ECU.

By using the RTE 200, a signal may be read from a sensor or actuator connected to another controller and a control signal may be output.

The signal reading and outputting is available because the RTE 200 provides a common application programming interface (API) to an application by abstracting both an external communication method of an ECU that uses a network such as controller area network (CAN), FlexRay, local interconnect network (LIN) and media oriented systems transport (MOST) and an internal communication method.

The RTE 200 may independently provide an ECU with communication among the SWCs in the application layer 100 and a communication interface mapping between the SWC and the BSW.

That is, the RTE 200 connects the ASW no and the BSW 300 while exchanging data and interacting.

The RTE 200 may separate the ASW and a hardware.

The RTE 200 is an environment in which the VFB communication structure is implemented.

Because requirements of the RTE 200 vary depending on an ASW executed on an upper side of the RTE 200, the RTE 200 is required to be tailored.

A final RTE tailored by a setup task may vary for each ECU.

The BSW 300 provides services to an upper layer by abstracting the ECU and hardware.

The BSW 300 includes a service layer 310, an ECU abstraction layer (EAL) 320, a microcontroller abstraction layer (MCAL) 330 and a complex device driver layer 340.

The service layer 310 is an uppermost layer in the BSW 300 and provides a service for utilizing microcontroller resources in the application layer 100.

While access to an IO hardware is managed by the EAL 320, the service layer 310 provides various background functions (communication, memory, and OS) for system operation and overall control of modules in the BSW 300.

The service layer 310 may function as an OS, schedule manager, network communication manager, memory manager, diagnosis service, ECU state manager, and watchdog.

That is, the service layer 310 may include an OS, system service, memory service, and communication service.

Because it is efficient for the OS to directly control a hardware, the service layer 310 is down to the MCAL 330.

The system service is a set of function and related modules that may be used in common, like an error management library such as cyclic redundancy check (CRC) and real-time operating system (RTOS) service including timer service. Also, the system service provides a basic service of a microcontroller in the BSW and ASW modules.

The memory service may include the NVM 311 and provide abstractions for memory locations and memory properties.

Also, the memory service manages storage and loading of data in the non-volatile memory, data verification using checksum, and stable data storage.

The memory service performs access to memory clusters, devices or software functions to read and write data in the non-volatile memory such as flash or electrically erasable programmable read only memory (EEPROM).

The NVM 311 performs data storage and maintenance of data in the non-volatile memory according to individual requirements of a vehicle environment.

That is, the NVM 311 manages non-volatile data of EEPROM and/or flash EEPROM emulation.

The communication service may include modules for vehicle network communication such as CAN, LIN, FlexRay, and MOST.

The communication service interfaces from the application layer 100 to a communication driver through communication hardware abstraction. That is, the communication service interfaces with a vehicle network through the same interface regardless of the type of the vehicle network, and manages the network.

The EAL 320 interfaces drivers of the MCAL 330 to an upper layer.

The EAL 320 serves to provide the same interface to the ASW without relocating a hardware circuit, when an external device such as a sensor or actuator is connected to an ECU.

The EAL 320 abstracts all basic components of an ECU. Also, conceptually, an ECU may encompass a larger scope than a micro control unit (MCU).

The EAL 320 provides a hardware-independent application programming interface (API).

Here, the hardware may include both inside and outside components of a microcomputer.

That is, the EAL 320 provides an API for a peripheral device to access various peripheral devices inside/outside of the microcontroller, and connects with a specific port or interface of the microcontroller.

The EAL 320 may provide drivers for external devices and interfaces for internal and external peripheral devices (IO, memory, watchdog, communication).

The EAL 320 includes an I/O hardware abstraction, a communication hardware abstraction, a memory hardware abstraction, and an onboard device abstraction.

The I/O hardware abstraction serves to abstract locations of peripheral I/O devices and ECU hardware layout and hide the ECU hardware layout from an upper software layer.

The communication hardware abstraction performs abstraction on a communication controller and related ECU hardware layout.

The memory hardware abstraction abstracts a memory-related hardware.

The memory hardware abstraction may be used for management of non-volatile memory.

The memory hardware abstraction may include a memory abstraction interface module (MemIf) 321 and a flash EEPROM emulation (Fee) 322.

The MemIf 321 facilitates abstraction in the Fee 322.

The MemIf 321 may facilitate abstraction in an EEPROM abstraction (EA) module (not shown).

The EA module provides services for reading, writing and erasing data from EEPROM and comparing a data block in EEPROM with a data block in memory (e.g., RAM).

The MemIf 321 provides the NVM 311 with virtual partitioning in a uniform linear address space.

The Fee 322 abstracts a device, specific addressing scheme and partitioning.

The Fee 322 provides the NVM 311 with a virtual addressing scheme, partitioning, and virtual unlimited erasing cycles.

The onboard device abstraction abstracts an onboard-related hardware.

The MCAL 330 is the lowest layer in the AUTOSAR platform, and a hardware layer (not shown) may be provided below the MCAL 330.

The MCAL 330 provides a device driver API to utilize MCU resources or functions of an upper layer.

The MCAL 330 includes a microcontroller driver, memory driver, communication driver and IO driver.

The microcontroller driver provides a function for directly accessing a microcontroller and a peripheral interface.

The memory driver is a driver for a memory map of an external memory device and an on-chip memory inside of the microcontroller.

A flash driver (Fls) 331 initializes a flash and reads and writes to a flash memory.

The Fls 331 may perform a service of comparing a data block with a data block of memory.

The communication driver is a driver for vehicle communication and onboard communication such as a data link layer of SPI, I2C, CAN and OSI.

The IO driver is a driver for analog digital I/O such as ADC, PW and DIO, etc.

The complex device driver (CDD) 340 supports compatibility between an external device and the platform during operation.

The CDD 340 is used to control a sensor and actuator that has specific timing requirements or has no module defined in AUTOSAR. That is, the CDD 340 may directly access the microcomputer to control the sensor or actuator.

Figure 2:
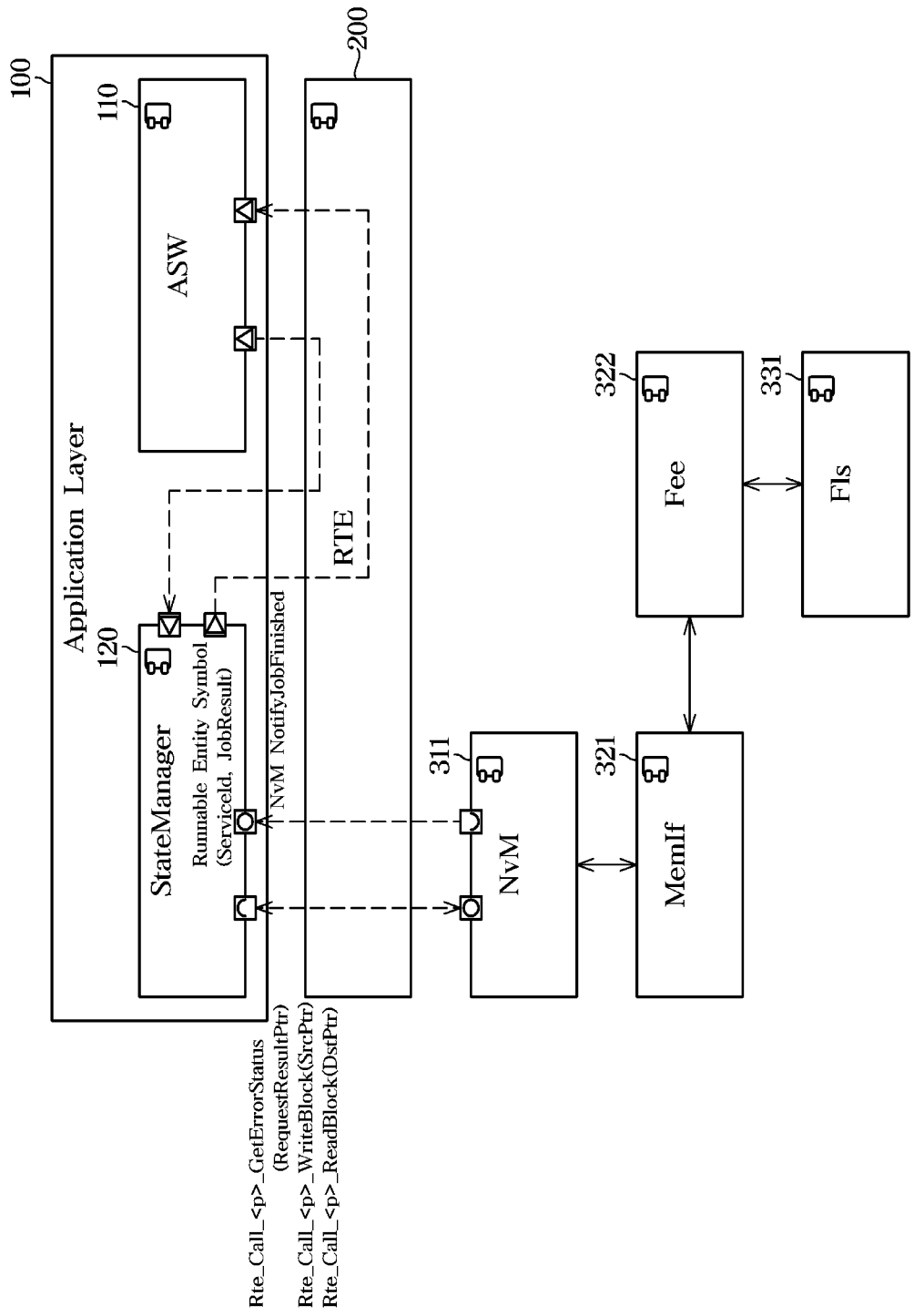
FIG. 2 is a diagram illustrating an example of an architecture for memory management according to an embodiment.
Figure 3:
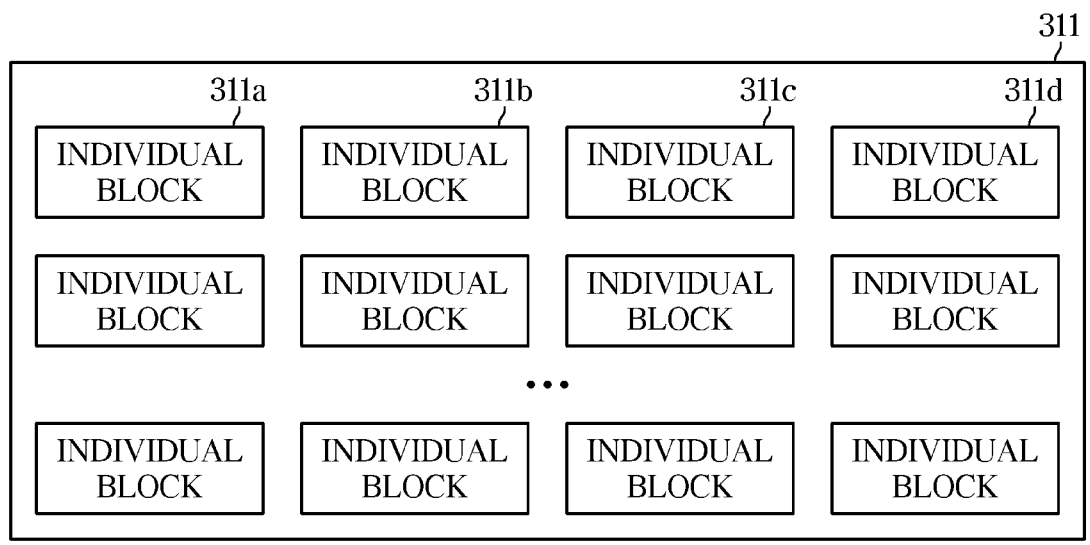
FIG. 3 is a diagram illustrating an example of blocks in an architecture according to an embodiment.

FIG. 2 is a diagram illustrating an example of an architecture for memory management according to an embodiment. FIG. 3 is a diagram illustrating an example of blocks in the NVM according to an embodiment.

The architecture for memory management includes the ASW 110 and the state manager software component 120 in the application layer 100, the RTE 200, and the NVM 311, the MemIf 321, the Fee 322 and the flash driver (Fls) 331 in the BSW 300 in the AUTOSAR platform illustrated in FIG. 1.

The ASW 110 checks data to be written in the state manager software component 120 in response to a request from the state manager software component 120, and transmits the checked data.

That is, the ASW 110 may transmit data read through a predetermined read function (Rte_Read) to the state manager software component 120.

The ASW 110 may store data received from the state manager software component 120.

The ASW 110 may receive data through a predetermined write function (Rte_Write) and write the received data.

The state manager software component 120 may control an operation of reading data stored in a non-volatile memory or writing data to the non-volatile memory, when a vehicle is turned on or off.

More specifically, the state manager software component 120 reads data to be written to the NVM 311 from the ASW 110.

When controlling the write operation, the state manager software component 120 may request the NVM 311 of the BSW shown in FIG. 3 to an error status check service.

When it is determined that a result of checking a status of an individual block is not in a pending state when controlling the write operation, the state manager software component 120 may request a write block service from the NVM 311 by using the read data as a factor.

The state manager software component 120 may set a flag to 'on' for a block in which data writing is completed, and when data writing for all blocks is completed, may initialize flags and control to write on other data.

When writing of all data is completed in the state manager software component 120, the state manager software component 120 calls a completion function (NVM JobFinished) from the BSW 300.

When controlling the read operation, the state manager software component 120 may request the NVM 311 of the BSW to an error status check service to check a status of an individual block.

When it is determined that a result of checking is not in a pending state when controlling the read operation, the state manager software component 120 may request a read block service from the NVM 311.

The state manager software component 120 may set a flag to 'on' for a block in which data reading is completed, and when data reading for all blocks is completed, may initialize flags and control to read on other data.

The state manager software component 120 performs the read operation in hardware in response to a read block service (ReadBlock service).

When reading of all data is completed in the state manager software component 120, the state manager software component 120 calls the completion function (NVM JobFinished) from the BSW 300.

When performing the write operation and read operation, the state manager software component 120 may check an Rte error using a return value of an Rte function from the RTE 200.

For example, when performing the read operation of data from the ASW no, the state manager software component 120 may check the Rte error using the return value of the Rte function.

When requesting the error status check service (Get Error Status) and a write block service from the NVM 311 during the write operation, the state manager software component 120 may check the Rte error using the return value of the Rte function from the RTE 200.

When requesting the error status check service (Get Error Status) and a read block service from the NVM 311 during the read operation, the state manager software component 120 may check the Rte error using the return value of the Rte function from the RTE 200.

When the read operation is completed, the state manager software component 120 may check the Rte error using the return value of the Rte function from the RTE 200.

The RTE 200 performs mapping between the ASW no and the state manager software component 120, and transmits data and function call information between the ASW no and the state manager software component 120.

The RTE 200 performs mapping between the NVM 311 and the state manager software component 120, and transmits and receives data between the NVM 311 and the state manager software component 120.

When the request of error status check service for an individual block is received during the write operation or read operation, the NVM 311 in the BSW 300 may check an error status for the individual block and transmit information about the error status for the individual block to the state manager software component 120.

When the write block service request is received, the NVM 311 may perform a data write operation for each block, and when the data write operation for all blocks is completed, the NVM 311 may transmit the completion function (NVM JobFinished) to the state manager software component 120.

When the read block service request is received, the NVM 311 may perform a data read operation for each block, and when the data read operation for all blocks is completed, the NVM 311 may transmit the completion function (NVM JobFinished) to the state manager software component 120.

The MemIf 321, the Fee 322 and the Fls 331 are standard modules for a non-volatile memory management service.

Figure 4A:
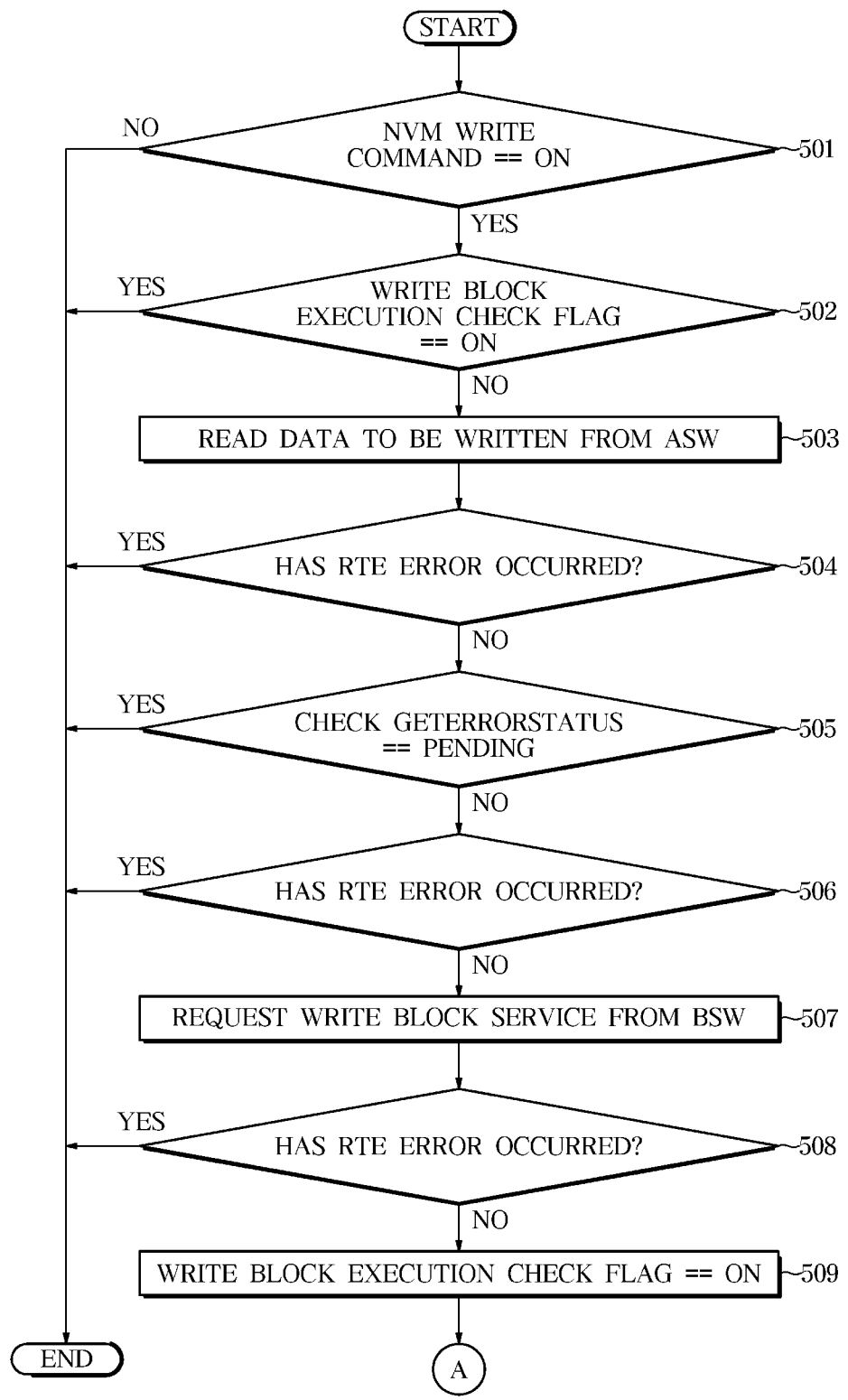
FIGS. 4A, 4B and 4C are flowcharts of a write operation of an architecture for memory management according to an embodiment.
Figure 4B:
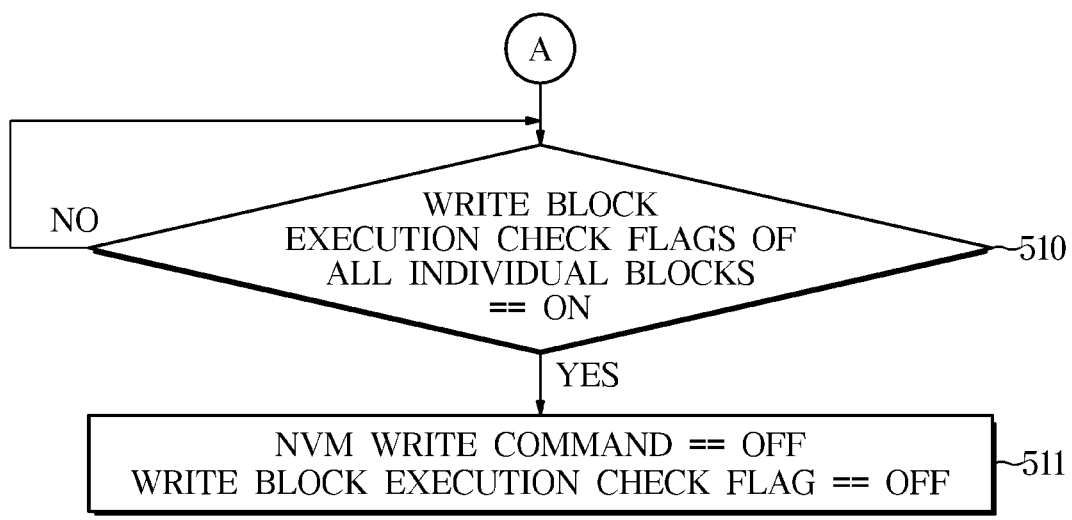
Figure 4C:
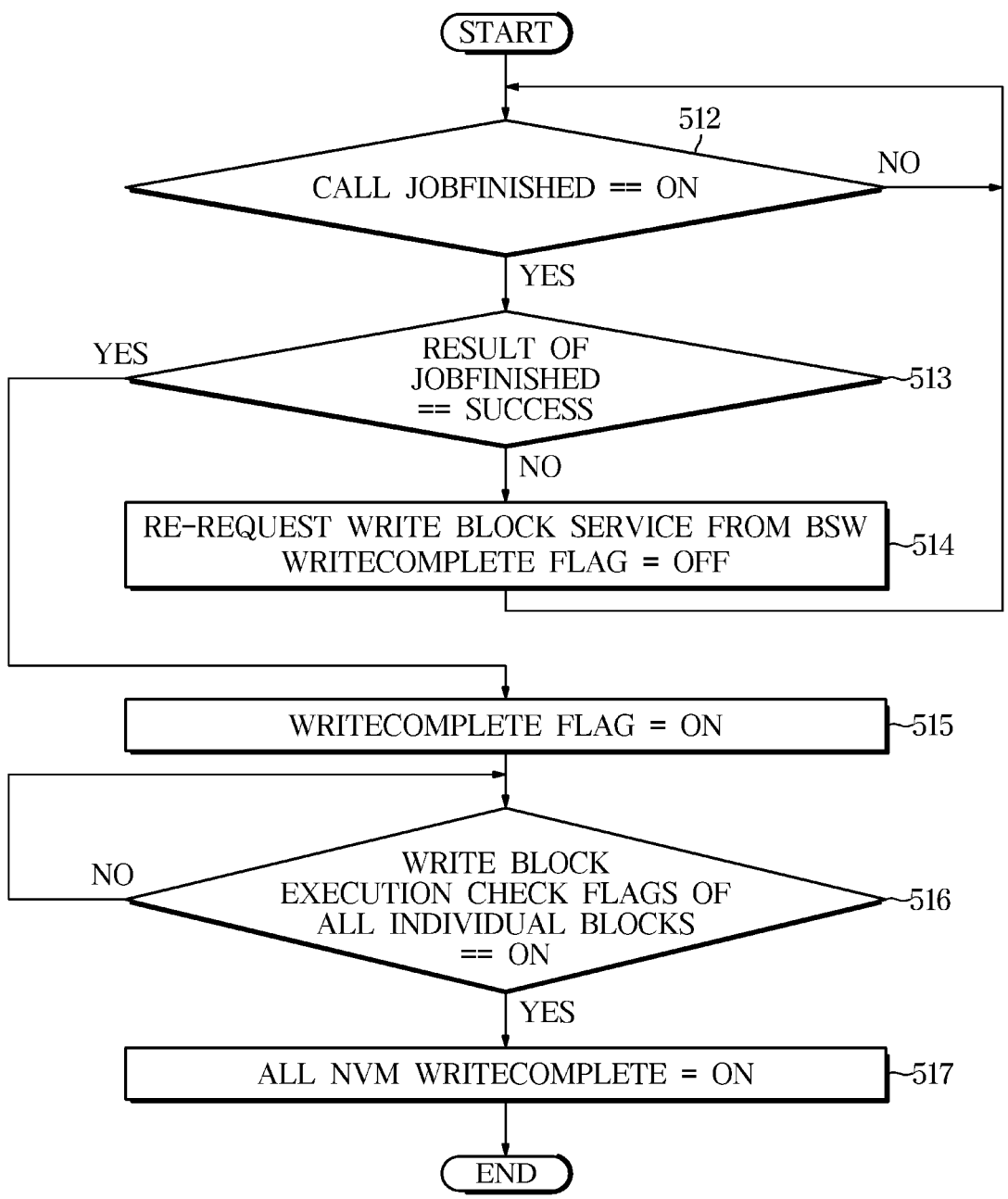

FIGS. 4A, 4B and 4C are flowcharts of a write operation of an architecture for memory management according to an embodiment.

When a write on command of the NVM 311 is received, the architecture starts a write cycle (501).

Here, the write on command is requested when required by comprehensively determining various conditions of a vehicle, and may be mainly requested when the vehicle is turned off (Key Off).

The architecture determines whether an individual block has requested a write block service from the BSW 300 in this cycle (or a current cycle) (502).

Determining whether the write block service has been requested includes determining whether a write block execution check flag is on.

Because a write operation is related to a lifetime of the NVM 311, whether the number of write block services performed at the reception of the write on command is only once checked. The number of write block services may be a preset number.

When the write block service has been requested in this cycle, the architecture ends this cycle for the corresponding block.

By contrast, when the write block service has not been requested in this cycle, the architecture reads (503) data to be written to the non-volatile memory from the ASW 110 by calling a predetermined read function (Rte_Read), and then determines whether an Rte error occurs (504) using a return value of an Rte function.

As such, whether an error occurs may be stepwise checked through RTE during data exchange, thereby improving reliability of data.

When it is determined that the Rte error occurs, the architecture ends the write operation for the corresponding block.

However, when it is determined that the Rte error does not occur, the architecture requests an error status check service (GetErrorStatus) from the BSW 300 to check a status of an individual block, and determines whether a result of the error status check service (GetErrorStatus) is in a pending state (505).

Through the above, the service is requested from the NVM 311 only when no error is found by checking a current status of the NVM 311, and thus reliability may be improved and the lifetime may be extended.

When requesting the error status check service (GetErrorStatus) from the BSW 300, the architecture determines whether an Rte error occurs using a return value of an Rte function (506).

When it is determined that the Rte error occurs, the architecture ends the write operation for the corresponding block.

Also, when it is determined that a result of the error status check service (GetErrorStatus) is in a pending state, the architecture ends the write operation for the corresponding block.

When it is determined that the result of the error status check service (GetErrorStatus) is not in a pending state and the Rte error does not occur, the architecture requests a write block service from the BSW 300 by using the read data as a factor (507), and then determines whether an Rte error occurs using a return value of an Rte function (508).

When it is determined that the Rte error occurs, the architecture ends the write operation for the corresponding block.

However, when it is determined that the Rte error does not occur, the architecture sets a write block execution check flag of an individual block to 'on' (509).

The architecture determines whether write block execution check flags of all blocks are on (510). When it is determined that the write block execution check flags of all blocks are on, the architecture initializes the flags so that a cycle may be performed from a beginning by a next write command (NVM Write).

The flag requiring initialization may include a flag for a write command and a write block execution check flag of an individual block. That is, the architecture may set the flag for the write command (NVM Write) and the write block execution check flag of an individual block to 'off' (511).

The architecture performs a write operation to the non-volatile memory in hardware after requesting the write block service, and when the write operation is completed, a completion function (NVM JobFinished) may be called from the BSW 300.

When the call is on (512) by the completion function (NVM JobFinished), the architecture determines whether a data write operation is successful (513).

When the data write operation fails, the architecture may request the write block service from the BSW 300 again and set a write complete flag (WriteComplete Flag) of the individual block to 'off' (514).

When the data write operation is successful, the architecture may set the write complete flag indicating that a final write operation of the individual block is completed, to 'on' (515).

Afterwards, the architecture may re-perform the write operation.

The architecture may check the write complete flags of all individual blocks, and when the write complete flags of all the individual blocks are on (516), may set all write complete flags (All NVM WriteComplete Flags) to 'on' (517).

The above operation is to turn off power of the ECU after confirming that the write operation for all individual blocks is normally completed, since a write command is requested when a vehicle is turned off (Key Off).

As such, by receiving feedback on the result obtained after requesting the write service, supplementary logic may be added in case of failure, and the vehicle is turned off after checking whether the write service of all blocks is normally performed. Accordingly, reliability may be improved.

Also, by controlling data writing to the non-volatile memory, reliability and complementarity of a write block in the NVM 311 may be improved.

Figure 5A:
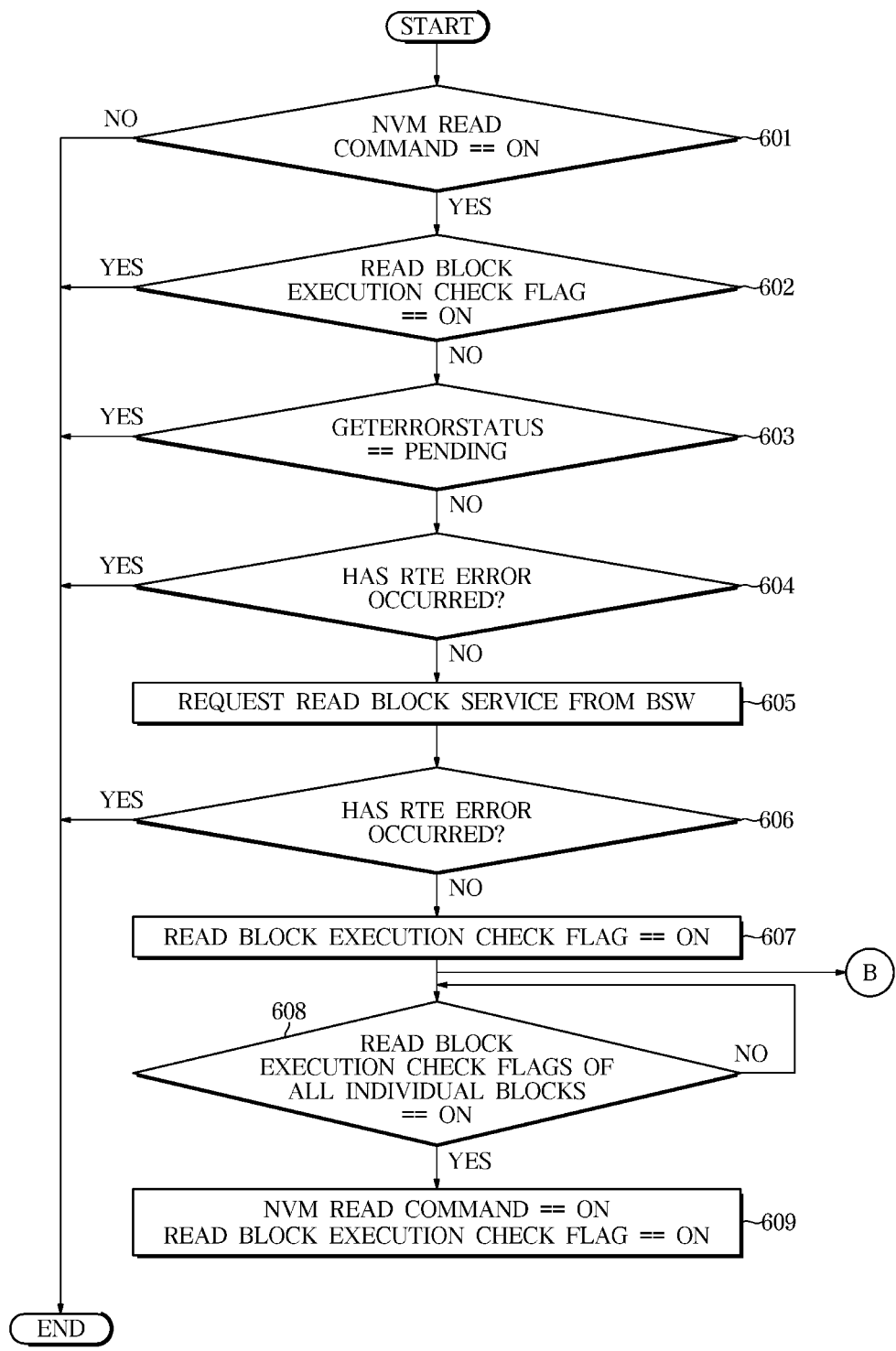
FIGS. 5A and 5B are flowcharts of a read operation of an architecture for memory management according to an embodiment.
Figure 5B:
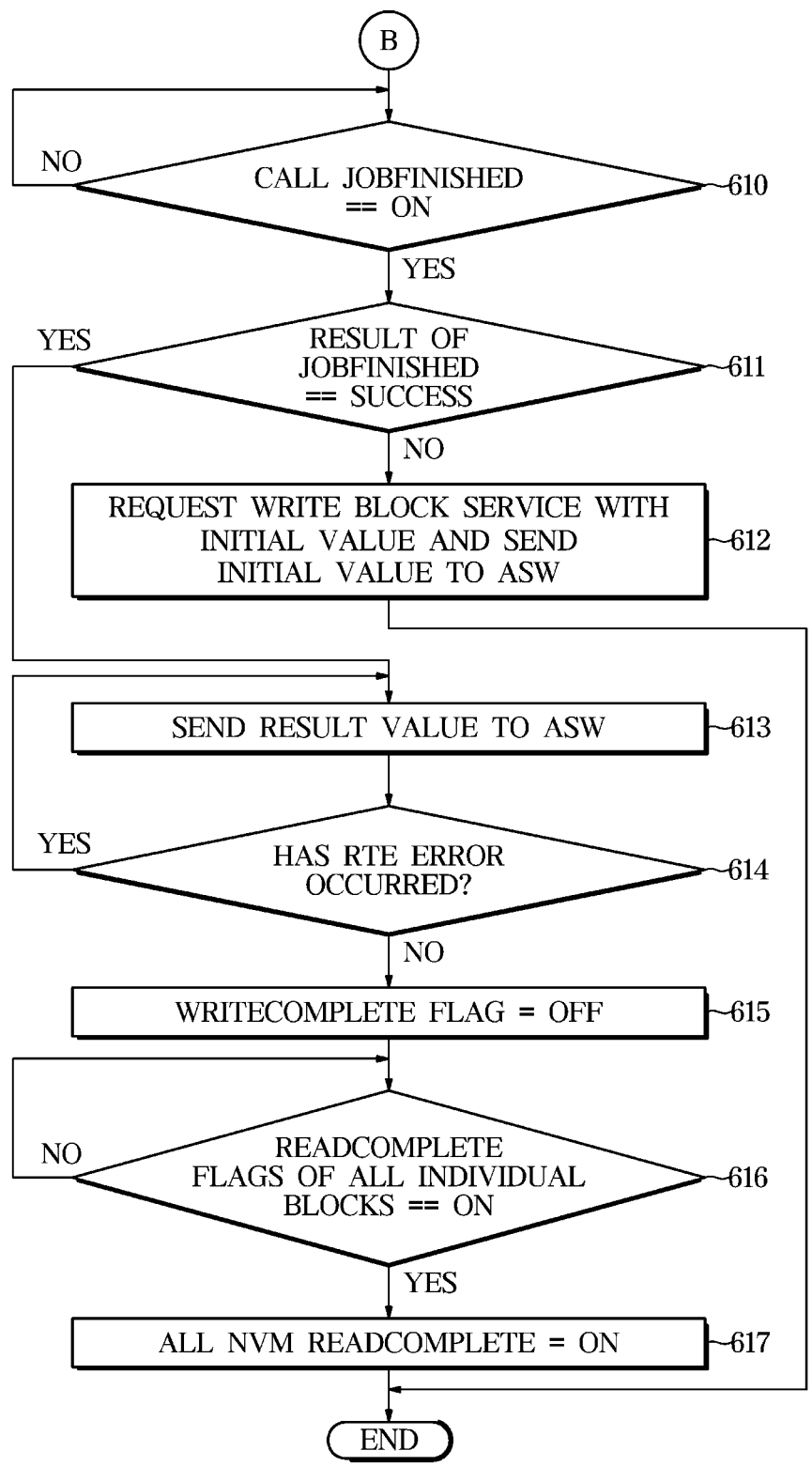

FIGS. 5A and 5B are flowcharts of a read operation of an architecture for memory management according to an embodiment.

The architecture determines whether a read command (NVM Read) is on (601), and when it is determined that the read command (NVM Read) is received, performs a read cycle.

Determining whether the read command (NVM Read) is on includes determining whether the read command (NVM Read) is received.

The read command (NVM Read) is requested when required by comprehensively determining various conditions of a vehicle, and may be mainly received when the vehicle is turned on (Key On).

The architecture determines whether a read block execution check flag is on (602).

The architecture checks whether an individual block has requested a read block service (ReadBlock service) from the BSW 300 in this cycle, and when it is determined that the read block service (ReadBlock service) has been requested, the architecture ends this cycle (i.e., current cycle) for the corresponding block.

Because read and write are related to the lifetime of the NVM 311 and the non volatile memory, whether the number of read block services performed at the reception of the read command (NVM Read) is only once checked.

When it is determined that the read block service (ReadBlock service) has not been requested, the architecture requests an error status check service (GetErrorStatus) from the BSW 300 to check a status of an individual block, and determines whether a result of the error status check service (GetErrorStatus) is in a pending state (603).

The service is requested from the NVM 311 only when no error is found by checking a current status of the NVM 311, and thus reliability may be improved and the lifetime may be extended.

Also, when requesting the error status check service (GetErrorStatus), the architecture determines whether an Rte error occurs using a return value of an Rte function (604).

When it is determined that the Rte error occurs, the architecture ends a read operation for the corresponding block.

When it is determined that the result of the error status check service (GetErrorStatus) is in a pending state and the Rte error occurs, the architecture ends the read operation for the corresponding block.

When it is determined that the result of the error status check service (GetErrorStatus) is not in a pending state and the Rte error does not occur, the architecture requests the read block service (ReadBlock service) from the BSW 300 (605), and then determines whether an Rte error occurs using a return value of an Rte function (606).

When it is determined that the Rte error occurs, the architecture ends the read operation for the corresponding block.

When it is determined that the Rte error does not occur, the architecture sets a read block execution check flag of an individual block to 'on' (607).

The architecture determines whether the read block execution check flags of all blocks are on (608), and when it is determined that the read block execution check flags of all blocks are on, the architecture initializes the flags so that a cycle may be performed by a next read command.

Here, the flag initialized may include a flag for a read command and a read block execution check flag of the individual block.

That is, the architecture may set the flag for the read command and the read block execution check flag of the individual block to 'off' (609).

The architecture performs a read operation to the non-volatile memory in hardware after requesting the read block service, and when the read operation is completed, a completion function (NVM JobFinished) may be called from the BSW 300.

In this instance, when the call is on (610) by the completion function (NVM JobFinished), the architecture determines that the data read operation is completed and determines whether the data read operation is successful (611).

When it is determined that the data read operation fails, the architecture requests a write block service from the BSW 300 with an initial value of the individual block and sends the initial value to the ASW 110 (612) by calling a write function (Rte_Write).

When it is determined that the data read operation is successful, the architecture obtains a result value of the read operation by calling a read function (Rte_Read), and sends the obtained result value to the ASW 110 (613). Also, the architecture determines whether an Rte error occurs using a return value of an Rte function (614).

Whether an error occurs may be stepwise checked during data exchange in RTE, thereby improving reliability of the data.

When it is determined that the Rte error occurs, the architecture calls the write function (Rte_Write) again.

When it is determined that the Rte error does not occur, the architecture initializes a write complete flag (WriteComplete Flag) of the individual block to 'off' (615).

A corresponding flag is initialized at the completion of the read operation, because a result of operation completion for a second write block service may not be distinguished when a write block operation is performed more than twice.

The architecture checks read complete flags (ReadComplete Flags) of all the individual blocks and determines whether the read complete flags of all the individual blocks are on (616). When it is determined that the read complete flags of all the individual blocks are on, the architecture sets all read complete flags (All NVM ReadComplete Flag) to 'on' (617).

By receiving feedback on the result obtained after requesting the service from the NVM 311, supplementary logic may be added in case of failure, and by checking whether the service of all blocks is normally performed in the NVM 311, reliable data may be delivered to the ASW 110.

The architecture may re-perform the read operation in the event of read failure.

Also, when it is determined that an error occurs in the RTE 200, the architecture may re-determine whether an error occurs by calling the Rte function again.

In addition, the architecture may perform determination on whether an error occurs a preset number of times.

As is apparent from the above, according to the embodiments of the disclosure, data reliability can be secured by checking errors in all stages during data movement when a runtime environment function and a basic software function related to a non-volatile memory are used.

According to the embodiments of the disclosure, a lifetime of a non-volatile memory can be increased by minimizing calls of write block (WriteBlock) and read block (ReadBlock) services.

According to the embodiments of the disclosure, when an error occurs while a write block (WriteBlock), a read block (ReadBlock) and a runtime environment function are used, a preset supplementary code can be used to prevent a serious malfunction of the vehicle and restore the malfunction.

According to the embodiments of the disclosure, management quality of non-volatile memory as well as the quality, marketability, safety and competitiveness of a vehicle can be improved.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording mediums.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle comprising:
   a non-volatile memory; and
   a processor connected to and configured to manage the non-volatile memory,
   wherein the processor is configured to:
      in a state of writing data to or reading data from the non-volatile memory, end a read operation or a write operation based on a number of reads being greater than or equal to a preset number of read times or a number of writes being greater than or equal to a preset number of write times;
      when performing the write operation or the read operation:
         identify a runtime environment (RTE) error based on a return value of a RTE function from a RTE, and end the write operation or the read operation in response to a determination that the RTE error occurs;
      set a write block execution check flag of an individual block and a read block execution check flag of an individual block to on when it is determined that the RTE error does not occur;
      determine whether write block execution check flags of all blocks are on;
      when it is determined that the write block execution check flags of all blocks are on, initialize the write block execution check flags;
      determine whether the read block execution check flags of all blocks are on; and
      when it is determined that the read block execution check flags of all blocks are on, initialize the read block execution check flags.

2. The vehicle of claim 1, wherein the processor is further configured to:
   control the read operation of reading data stored in the non-volatile memory, when the vehicle is turned on; and
   control the write operation of writing data to the non-volatile memory, when the vehicle is turned off.

3. A vehicle comprising:
   a non-volatile memory; and
   a processor connected to and configured to manage the non-volatile memory,
   wherein the processor is configured to:
      in a state of writing data to or reading data from the non-volatile memory, end a read operation or a write operation based on a number of reads being greater than or equal to a preset number of read times or a number of writes being greater than or equal to a preset number of write times, in response to a write on command;
      when performing the write operation, identify a runtime environment (RTE) error based on a return value of a RTE function from a RTE and end the write operation in response to a determination that the RTE error occurs;
      set a write block execution check flag of an individual block to on when it is determined that the RTE error does not occur;
      determine whether write block execution check flags of all blocks are on;
      when it is determined that the write block execution check flags of all blocks are on, initialize the write block execution check flags;
      call a predetermined read function so that data to be written to the non-volatile memory is read; and
      write the read data to the non-volatile memory.

4. The vehicle of claim 3, wherein the processor is further configured to determine, when the data is read through the RTE, whether the RTE error occurs.

5. The vehicle of claim 3, wherein the processor is further configured to determine, when requesting a write block service, whether the RTE error occurs.

6. The vehicle of claim 3, wherein the processor is further configured to:
   request, when controlling the write operation, an error status from the non-volatile memory;
   determine whether the error status is in a pending state;
   end the write operation in response to a determination that the error status is in the pending state; and
   request a write block service from the non-volatile memory by using the reading data as a factor in response to a determination that the error status is not in the pending state.

7. The vehicle of claim 6, wherein the processor is further configured to determine, when requesting the write block service, whether the RTE error occurs.

8. The vehicle of claim 3, wherein the processor is further configured to:
   set a flag to 'on' for a block in which writing of the read data is completed; and
   initialize the flag when data writing for all blocks of the non-volatile memory is completed.

9. A vehicle comprising:
a non-volatile memory; and
a processor connected to and configured to manage the non-volatile memory,
wherein the processor is configured to:
- in a state of writing data to or reading data from the non-volatile memory, end a read operation or a write operation based on a number of reads being greater than or equal to a preset number of read times or a number of writes being greater than or equal to a preset number of write times;
- when performing the read operation, identify a runtime environment (RTE) error based on a return value of a RTE function from a RTE and end the read operation in response to a determination that the RTE error occurs;
- set a write block execution check flag of an individual block to on, when it is determined that the RTE error does not occur;
- determine whether write block execution check flags of all blocks are on, when it is determined that the write block execution check flags of all blocks are on, and initialize the write block execution check flags; and
- request, when a read on command is received, an error status from the non-volatile memory to check a status of an individual block of the non-volatile memory.

10. The vehicle of claim 9, wherein the processor is further configured to determine, when requesting the error status, whether the RTE error occurs.

11. The vehicle of claim 10, wherein the processor is further configured to determine, when requesting a read block service, whether the RTE error occurs.

12. The vehicle of claim 9, wherein the processor is further configured to:
- determine, when controlling the read operation, whether the error status is in a pending state; and
- request a read block service from the non-volatile memory in response to a determination that the error status is not in the pending state.

13. The vehicle of claim 12, wherein the processor is further configured to end the read operation in response to a determination that the error status is in the pending state.

14. The vehicle of claim 9, wherein the processor is configured to:
- set a flag to 'on' for a block in which data reading is completed; and
- initialize the flag when data reading for all blocks of the non-volatile memory is completed.

15. The vehicle of claim 9, wherein the processor is further configured to call a predetermined read function and read databased on the predetermined read function in response to the read on command.

16. The vehicle of claim 15, wherein the non-volatile memory is configured to receive the data through a predetermined write function and write the received data.

* * * * *